United States Patent [19]

Scholz et al.

[11] Patent Number: 5,420,732
[45] Date of Patent: May 30, 1995

[54] ARRANGEMENT COMPRISING A MAGNETIC-TAPE-CASSETTE APPARATUS WITH A DECK AND WITH A LOADING MECHANISM FOR MAGNETIC-TAPE CASSETTES

[75] Inventors: Thomas Scholz, Mengerskirchen-Winkels; Stefan Koch, Bad Endbach, both of Germany

[73] Assignee: U.S. Philips Corporation, New York, N.Y.

[21] Appl. No.: 885,993

[22] Filed: May 19, 1992

[30] Foreign Application Priority Data

May 24, 1991 [DE] Germany .................. 41 16 920.4

[51] Int. Cl.⁶ .............................................. G11B 5/008
[52] U.S. Cl. ............................................... 360/96.5
[58] Field of Search ................. 360/96.5, 94, 96.6; 369/75.1

[56] References Cited

U.S. PATENT DOCUMENTS

| | | | |
|---|---|---|---|
| 5,067,036 | 11/1991 | Ozawa | 360/94 |
| 5,172,284 | 12/1992 | Ohshima | 360/94 |
| 5,196,972 | 3/1993 | Matsumaru et al. | 360/96.5 |

FOREIGN PATENT DOCUMENTS

| | | | |
|---|---|---|---|
| 58-100279 | 6/1983 | Japan | 360/94 |
| 58-139376 | 8/1983 | Japan | 360/94 |

Primary Examiner—A. J. Heinz
Assistant Examiner—Allen Cao
Attorney, Agent, or Firm—Norman N. Spain

[57] ABSTRACT

A magnetic-tape-cassette apparatus, with a detection mechanism in order to handle magnetic-tape cassette types (3, 13) with different tape-recording standards and housing configurations, which detection mechanism senses the cassette side wail (8, 17) having the access openings (8, 17) and comprises a sensing element which upon insertion of a cassette, depending on the cassette type, either moves past this cassette wall (8, 17) or engages a guide profile in order to be positioned before a sliding cover of this cassette type and move said cover so far that the access openings are exposed, the detection mechanism (41) being activated upon insertion of a magnetic-tape cassette in a longitudinal direction in which the tape spools are juxtaposed in that the short side wall which faces forward during insertion moves the sensing pin without the sliding cover at this instant already being urged towards the position in which it exposes the access openings, and as insertion proceeds the sensing pin moves to the long cassette side wall (8, 17) having the access openings (9, 10) and moves along this wall, the sensing pin detecting the cassette type just inserted and depending on its construction either moves freely past said wall up to the end of the insertion path for the one type or engages the guide profile in order to open the sliding cover (16) towards the end of the insertion path for the other type.

19 Claims, 15 Drawing Sheets

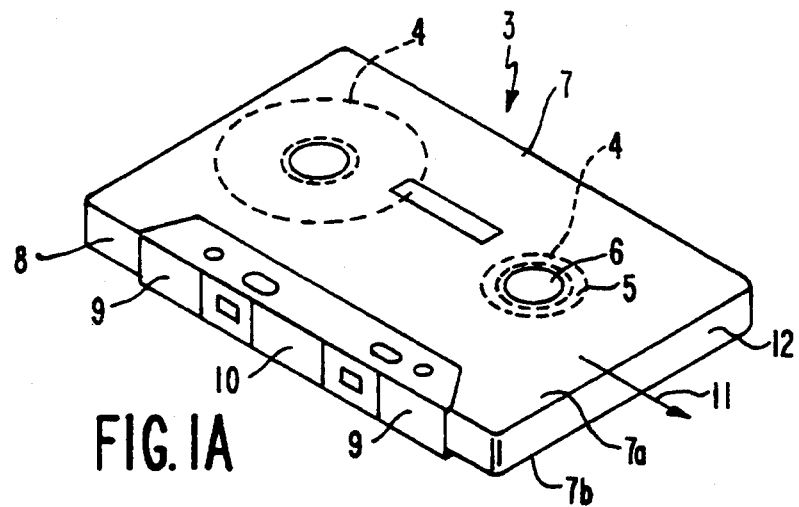
FIG. 1A
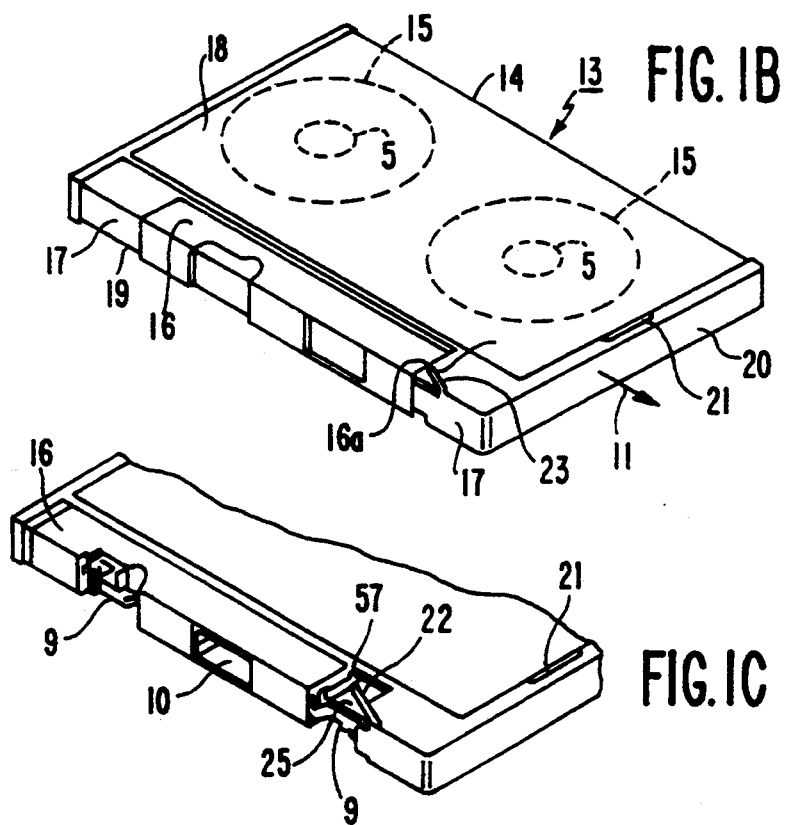
FIG. 1B
FIG. 1C

ARRANGEMENT COMPRISING A MAGNETIC-TAPE-CASSETTE APPARATUS WITH A DECK AND WITH A LOADING MECHANISM FOR MAGNETIC-TAPE CASSETTES

BACKGROUND OF THE INVENTION

The invention relates to an arrangement comprising a magnetic-tape-cassette apparatus, which apparatus comprises a deck and a loading mechanism having a holder for magnetic-tape cassettes, into which holder the cassettes can be inserted, and magnetic-tape cassettes having recesses in plane-parallel main walls and having in a side wall interconnecting the main walls access openings for the entry of a sound head and pressure rollers, a detection mechanism being provided in order to handle magnetic-tape cassette types with different tape-recording standards and housing configurations, which detection mechanism senses the cassette side wall having the access openings and comprises a sensing element which upon insertion of a cassette, depending on the cassette type, either moves past this cassette wall or engages a guide profile in order to be positioned before a sliding cover of this cassette type and move said cover so far that the access openings are exposed.

Such an arrangement comprising a magnetic-tape-cassette apparatus and a magnetic-tape cassette which functionally cooperate with one another is known from German patent P 37 19 890.4. The loading mechanism of said arrangement is described in German Patent P 39 04 483.1. In said mechanism a cassette holder can be lowered vertically from an ejection plane into a playback plane. The cassette holder is adapted to handle analog magnetic-tape cassettes having two tape reels which when inside the apparatus are engaged by reel spindles of the deck through the two cassette main walls. The magnetic tape is moved in its longitudinal direction past a magnetic head which is pressed against the tape and which, like the pressure rollers, can be inserted into the cassette through access openings in the partly open side wall of the cassette. The access openings of the analog cassette are always open. Them is provided a coupling member which when a cassette is inserted by hand is engageable in the forward reel-spindle hole viewed in the direction of insertion. This coupling member pulls the magnetic-tape cassette further inward into the play position after starting of a loading motor.

A digital audio magnetic-tape cassette is known whose magnetic tape is scanned by means of a rotating magnetic head. The dimensions of this digital audio cassette differ from those of the analog audio cassettes to such an extent that an entirely different tape deck must be used.

Moreover, a digital audio magnetic-tape cassette has been proposed whose magnetic tape is scanned longitudinally. This digital longitudinally scanned magnetic-tape cassette has an appearance resembling the analog magnetic-tape cassette. It is envisaged to use this digital cassette in magnetic-tape-cassette apparatuses which can play both analog and digital cassettes in a tape deck constructed for both cassette types. The digital cassette differs from the analog cassette in that it can be played in only one direction. Therefore, the cassette has reel-spindle holes for the introduction of reel spindles in only one main wall. Moreover, it has a sliding cover which in its closed position covers the openings in the partly open side wall for the insertion of the magnetic head and the pressure rollers. Before the cassette is put into operation this sliding cover should be moved aside.

It is also known to insert such a digital magnetic-tape cassette into a holder compartment with its long side wall in the transverse direction. A detection mechanism comprising a sensing pin then detects the cassette type and moves aside the sliding cover of the digital cassette to expose the access openings.

SUMMARY OF THE INVENTION

It is an object of the invention to modify an arrangement of the type defined in the opening paragraph, which arrangement comprises a magnetic-tape-cassette apparatus capable of playing longitudinally scanned magnetic-tape cassettes in accordance with an analog tape-recording standard, in such a manner that it is also capable of playing longitudinally scanned magnetic-tape cassettes in accordance with the digital tape-recording standard which are inserted into a holder compartment in the longitudinal direction.

According to the invention said object is achieved in that upon insertion of a magnetic-tape cassette in a longitudinal direction in which the tape spools are juxtaposed the detection mechanism is activated in that the short side wall which faces forward during insertion moves the sensing pin without the sliding cover at this instant already being urged towards the position in which it exposes the access openings, and as insertion proceeds the sensing pin moves to the long cassette side wall having the access openings and moves along this wall, the sensing pin detecting the cassette type just inserted and depending on its construction either moves freely past said wall up to the end of the insertion path for the one type or engages the guide profile in order to open the sliding cover towards the end of the insertion path for the other type.

Since in the case of longitudinal insertion the detection mechanism only senses the side wails interconnecting the main wails the introduction of the detection mechanism does not lead to an increased overall height of the loading mechanism.

In a further embodiment of the invention
 the detection mechanism comprises a multiple-lever system which under spring load cooperates with cassette side walls at both sides of a cassette corner which in the direction of insertion bounds the forward end of the partly open side wail of the cassette,
 upon insertion of a cassette a sensing element on a sensing lever of the multiple-lever system is moved against the spring load by the cassette side wail facing forward in the direction of insertion,
 at the same time an opening lever of the multiple-lever system senses the partly open side wail to detect a guide profile of the magnetic-tape cassette comprising the sliding cover.

Thus, the detection mechanism can detect which cassette type is inserted into the cassette holder.

In a further embodiment of the invention the opening lever has a profile which cooperates with a stop of the cassette holder in such a manner that upon detection of a guide profile by the sensing element the opening lever can be moved in the direction of insertion past the stop and in the absence of a guide profile said opening lever remains in engagement with the stop. Thus, the opening lever defines the subsequent cycle of movements of the detection mechanism.

In a further embodiment of the invention, when the opening lever is moved along in the direction of insertion, the point where opening of the sliding cover begins is transferred to such a mutual position of the cassette and the loading aperture in the front panel of the apparatus that when opening begins the sliding cover is already situated behind the front edge of the front panel (correctly inserted digital cassette).

This eliminates a psychological disadvantage. If during insertion of a magnetic-tape cassette with a sliding cover this cover would moved back already while it is still visible this would be visually undesirable and could be sensed with the fingers of the hand with which insertion is effected. If the sliding cover is not moved until the magnetic-tape cassette has almost disappeared in the cassette holder and the sliding cover is consequently no longer visible the oppositely directed movements of the cassette housing and the sliding cover will neither be annoying to the eye nor the fingers. The second disadvantage which is eliminated is that in its closed position the sliding cover at the same time locks the reels. As long as the reels are locked the magnetic tape cannot move freely, for example slacken. If the sliding cover is opened only very late slackening of the magnetic tape is not possible until the last instant of the movement of the magnetic-tape cassette into the play position.

In a further embodiment of the invention, when arrested by the stop upon insertion of the cassette, the opening lever is forced to move along the partly open side wall, the sensing element being forced to move around the cassette corner even in the case of a small spring load (analog or misinserted digital cassette). As a result of this, the opener spring is only tensioned to a very small extent. This ensures that the pressure exerted on the cassette side wall is small.

In a further embodiment of the invention the sensing lever pivotally cooperates with the opening lever by means of a pivot, which opening lever cooperates with a supporting lever by means of a pivot, which supporting lever is pivotally mounted on the cassette holder, the sensing lever being connected to the cassette holder by means of an opener spring in such a manner that the opener spring which is tensioned upon insertion of the magnetic-tape cassette exerts a clockwise torque on the sensing lever and thus on the opening lever, which torque urges the sensing lever towards the cassette corner and the free lever end of the opening lever towards the partly open side wall of the cassette. This has the advantage that all tolerances are compensated for and guarantees that the opener pin is clamped between the guide profile and the sliding cover.

In a further embodiment of the invention the opening lever carries an opener pin which engages a guide profile if present, thereby enabling the profile of the opening lever to be disengaged from the stop. In this way it is achieved that opening of the sliding cover by means of the opener pin is controlled via the force ratio at the sensing lever.

In a further embodiment of the invention, with the opening lever disengaged, actuated by the cassette via the sensing dement and the sensing lever as well as the pivot and the pivot, the supporting lever pivots clockwise about its spindle, the opener pin being moved accordingly with the cassette in the direction of insertion, so that it cannot move the sliding cover relative to the cassette. In this way the detection mechanism stores energy for subsequently opening the sliding cover.

In a further embodiment of the invention a connecting line extends through the axis of the spindle of the sensing lever and the axis of the spindle between the sensing lever and the opening lever, and the point of application of the opener spring is situated on a normal to said connecting line at the location of the axis of the spindle, which spring is supported in the cassette holder. The choice of this point of application of the force results in a clockwise torque about the spindle of the sensing element.

In a further embodiment of the invention, upon insertion of the cassette, the sensing lever tensions the opener spring which via the pin exerts a force directed oppositely to the insertion force on the cassette and also exerts a force acting in a direction away from the cassette corner, thereby initially preventing the sensing element from moving around the cassette corner. Thus, the system of forces alone provides the movement of the detection mechanism in the direction of insertion.

In a further embodiment of the invention, when the cassette is inserted deeper and consequently the force directed away from the cassette corner ceases, the sensing element moves towards the cassette corner and moves around said corner as soon as the action of the force changes from an orientation away from the cassette corner to an orientation towards the cassette corner, upon which the opener pin begins to move the sliding cover in a direction opposite to the direction of insertion and thus to expose the access openings. Thus, the pathlength after which the sliding cover is opened can be determined accurately. This can be very briefly before the end of the insertion path.

In a further embodiment of the invention the opener spring is a loop spring having a first spring arm acting upon the pin of the sensing lever and having a second spring arm which at its end which is remote from the spring loop has a further loop, from which a third spring arm projects whose free end lies against a stop. Moreover, in a further embodiment the centre of the spring loop is always situated in an area which can be defined by an extension of the partly open side wall in the direction of insertion and a line parallel thereto and intersecting the spindle, the spring arms extending towards the extension of the partly open side wall. This results in well-defined directions of the forces opposite to the direction of insertion and away from the cassette corner. Moreover, it is achieved that the detection mechanism always returns to its initial position.

In a further embodiment of the invention, after the sensing element has moved around the corner upon detection of a digital magnetic-tape cassette, the opener pin, as the cassette is inserted deeper, moves along the guide profile until it engages behind a stop edge, the opener pin moving the sliding cover from the closed position into the open position. Thus, the sliding cover is opened in a direction opposite to the direction of insertion by the energy previously stored in the spring.

In a further embodiment of the invention the opener pin is latched behind the stop edge with the aid of a cassette-retaining member which is arranged on the cassette holder and which engages a coupling groove in the digital magnetic-tape cassette. The force of the sliding cover acting in the closing direction is thus cancelled by the position of the opener pin between the stop edge and the sliding-cover edge.

In a further embodiment of the invention, upon insertion of a magnetic-tape cassette into the cassette holder up to an end position, said holder together with the cassette can be moved further into a stop position, the cassette holder is latched against movement until the instant at which the cassette in it has reached its end position, latching of the cassette holder is not discontinued until the cassette-retaining member has already engaged the cassette.

This has the advantage that the cassette holder cannot be moved until the sliding cover has been fully opened mad the cassette-retaining member is in positive engagement with the cassette.

In a further embodiment of the invention, when latching of the cassette holder ceases, the cassette-retaining member has loosely engaged the cassette with a limb portion, and when the cassette has reached its stop position in the cassette holder the limb for the digital cassette is in full positive engagement with the coupling groove or the limb for the analog cassette is in full positive engagement with a reel-spindle hole. This accurately defines the position of the cassette relative to the holder.

In a further embodiment of the invention latching of the cassette holder is effected by means of a latching lever which is engageable behind a stop of the chassis with a latching hook, which is disengageable therefrom by the cassette, and which has a free end which is spring-loaded in the clockwise direction. This ensures that the cassette holder cannot move without a cassette in the holder or before the correctly inserted cassette has reached its end position.

The arrangement is particularly suitable for car radios.

BRIEF DESCRIPTION OF THE DRAWINGS

The invention will be described in more detail with reference to the drawings. In the drawings:

FIG. 1A shows an audio magnetic-tape cassette for analog recording and analog reproduction, FIG. 1B shows an audio magnetic-tape cassette for digital recording and digital reproduction, comprising a sliding cover which in the rest position covers the cassette openings at the front, FIG. 1C shows the cassette of FIG. 1B with the cover slid back, FIG. 10b is an isometric view of the mechanism shown in FIG. 10a, FIG. 10c is a side view of the loading mechanism shown in FIG. 10a.

DETAILED DESCRIPTION OF THE PREFERRED

Figure 2:
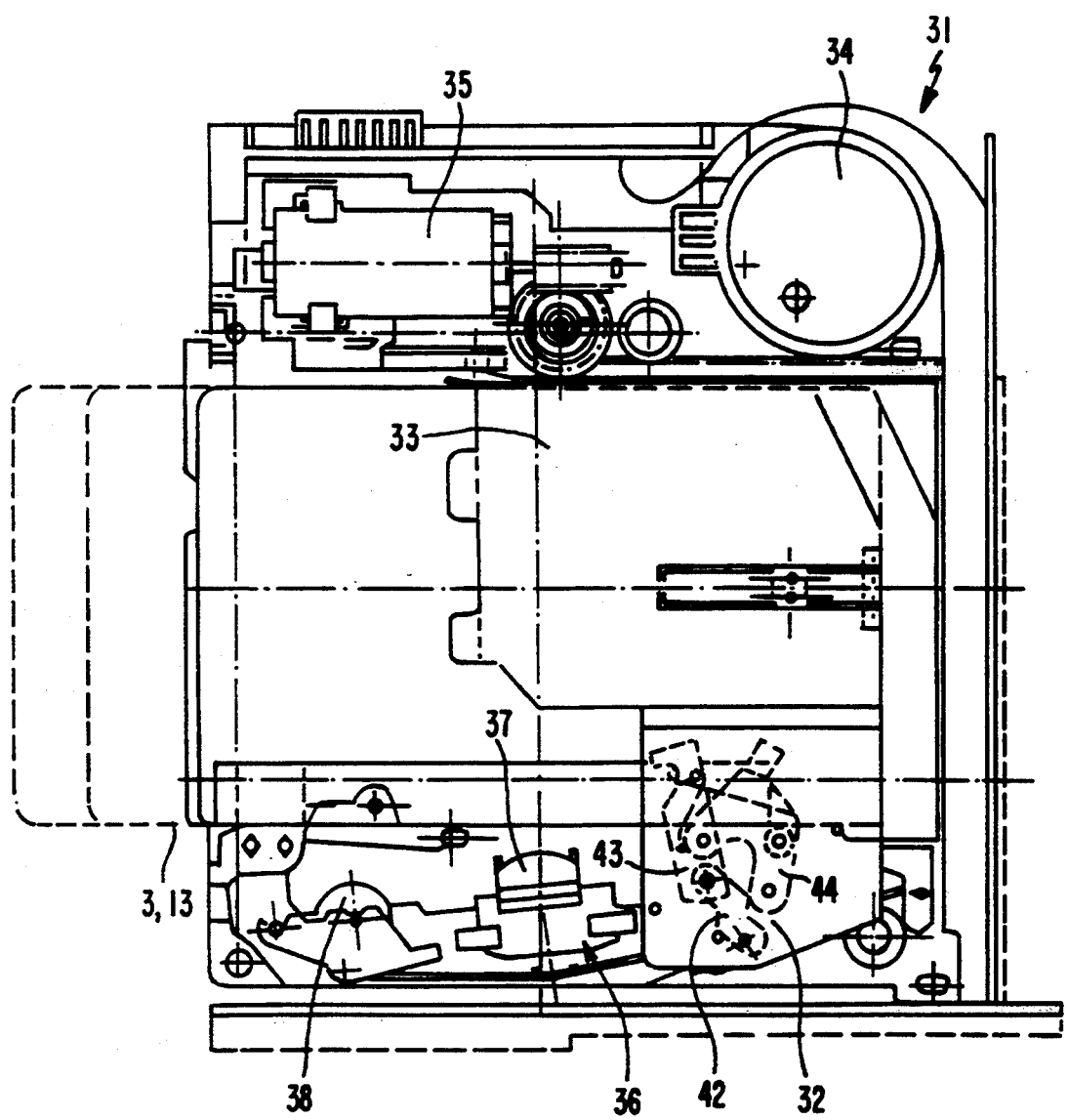
FIG. 2 shows a tape deck for a magnetic-tape-cassette apparatus having a loading mechanism for magnetic-tape; cassettes as shown in FIGS. 1A to 1C.

FIG. 1A shows a magnetic-tape cassette 3 for analog recording and reproduction, which accommodates spools 4 of magnetic tape. The magnetic-tape spools 4 have been wound on reel hubs 5 which are engageable by reel spindles, not shown, of a reproducing apparatus through reel-spindle holes 6 in the cassette housing 7. The narrow front wall, i.e. the partly open wall 8 of the housing 7 having parallel upper (7a) and lower (7b) main walls, has access openings 9 through which pressure rollers of the apparatus can be applied to the magnetic tape in the cassette 3 from the exterior. A further access opening 10 in the centre serves for the entry of a magnetic head. When the magnetic-tape cassette is used in an apparatus having a loading mechanism the cassette is inserted into a cassette holder 32 in the direction indicated by an arrow 11 with a narrow side wall facing forward.

The cassette 3 shown in FIG. 1A for analog recording and reproduction has reel-spindle holes 6 in both main walls 7a, 7b. Both main walls have thicker portions 51 with edges 51a.

FIG. 1B shows diagrammatically a magnetic-tape cassette 13 for digital recording and reproduction, which cassette comprises a housing 14 which again accommodates magnetic-tape spools 15. For a description of the digital cassette reference is made to EP-A 406,943. The magnetic-tape spools 15 have been wound on reel hubs 5, shown in broken lines. In the play position the reel hubs 5 are engaged by reel spindles, not shown, of the apparatus. This digital cassette 13 has reel-spindle holes only in the lower main wall 19 of the parallel main wails 18, 19.

The magnetic-tape cassette shown in FIG. 1B has a sliding cover 16 with an edge 16a, which cover is slidable on the partly open side wail 17 of the cassette to expose access openings 9 and 10 for the entry of pressure rollers and a magnetic head. In the situation shown in FIG. 1B the sliding cover 16 is in its closed position, in which it covers the access openings 9 and 10. The sliding cover 16 is U-shaped and not only covers the partly open wall 17 but also lies over an upper main wall 18 and a lower main wall 19 of the magnetic-tape cassette 13.

For playback in an apparatus having a loading mechanism the magnetic-tape cassette 13 is inserted into the holder 32 of the apparatus in the direction indicated by an arrow 11 with its side wall 20 facing forward, in the same way as shown in FIG. 1A. Near the forward side wall 20 a coupling groove 21 is formed in the cassette housing starting from the upper main wall 18. At the location of the partly open side wall 17 and the upper main wall 18 there is provided a guide profile 22. In the closed position of the sliding cover 16 as shown in FIG. 1B this guide profile is partly covered and only an entry portion 23 with a part of a guiding edge 24 is exposed. The guiding edge 24 projects from a guide surface 25 with which an opener pin 26, to be described hereinafter, is engageable. The cassette for digital recording and reproduction shown in FIG. 1B is shown in FIG. 1C with the sliding cover 16 opened, i.e. slid aside, and the access openings 9 and 10 exposed.

For playing this magnetic-tape-cassette apparatus comprises a loading mechanism 32 which can handle both magnetic-tape cassettes of the type shown in FIG. 1A and of the type shown in FIGS. 1B and 1C. FIG. 2 shows this loading mechanism in a plan view with a digitally recorded magnetic-tape cassette 13 inserted into the cassette holder. FIG. 2 further shows a motor 34 for driving the capstans and a motor 35 for driving the spools inside the magnetic-tape cassette. A head support 36 carries a sound head 37 and pressure rollers 38.

Figure 3:
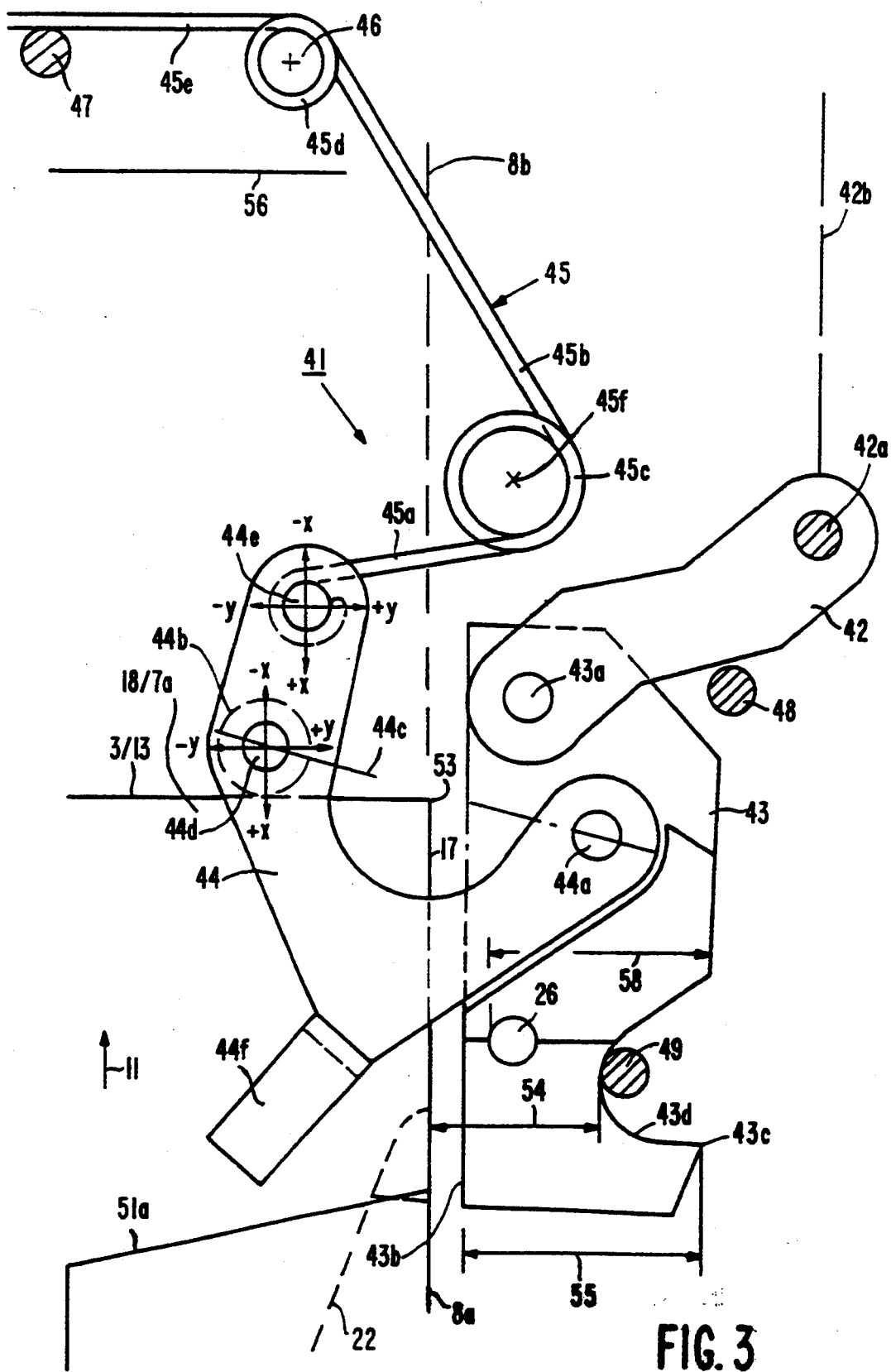
FIG. 3 shows the detection mechanism upon starting of the deck after insertion of a magnetic-tape cassette.

FIG. 3 shows a detection mechanism 41 which during the loading movement, i.e. during insertion of a cassette, detects whether this cassette is an analog cassette 3 as shown in FIG. 1A or a digital cassette 13 as shown in FIG. 1B. The detection mechanism comprises a supporting lever 42 mounted in the holder 33 by means of a spindle 42a. An opening lever 43 is supported on the supporting lever 42 by means of a spindle 43a. A sensing lever 44 acts upon the opening lever 43 by means of a spindle 44a. This sensing lever 44 carries a sensing roller 44b, hereinafter. A connecting line 44c extends through the axes of the spindle 44a of the sensing lever 44 and the spindle 44d of the sensing roller 44b. A pin 44e is situated on a normal to the connecting line 44c at the location of the axis of the spindle 44d and cooperates with an arm 45a of an opener spring 45. This opener spring 45, hereinafter also referred to as a loop spring, comprises a second arm 45b whose end which is remote from the loop 45c has a further loop 45d surrounding a pin 46. A further third arm 45e of the spring 45 extends from this loop 45d and lies always against a stop 47.

Figure 7:
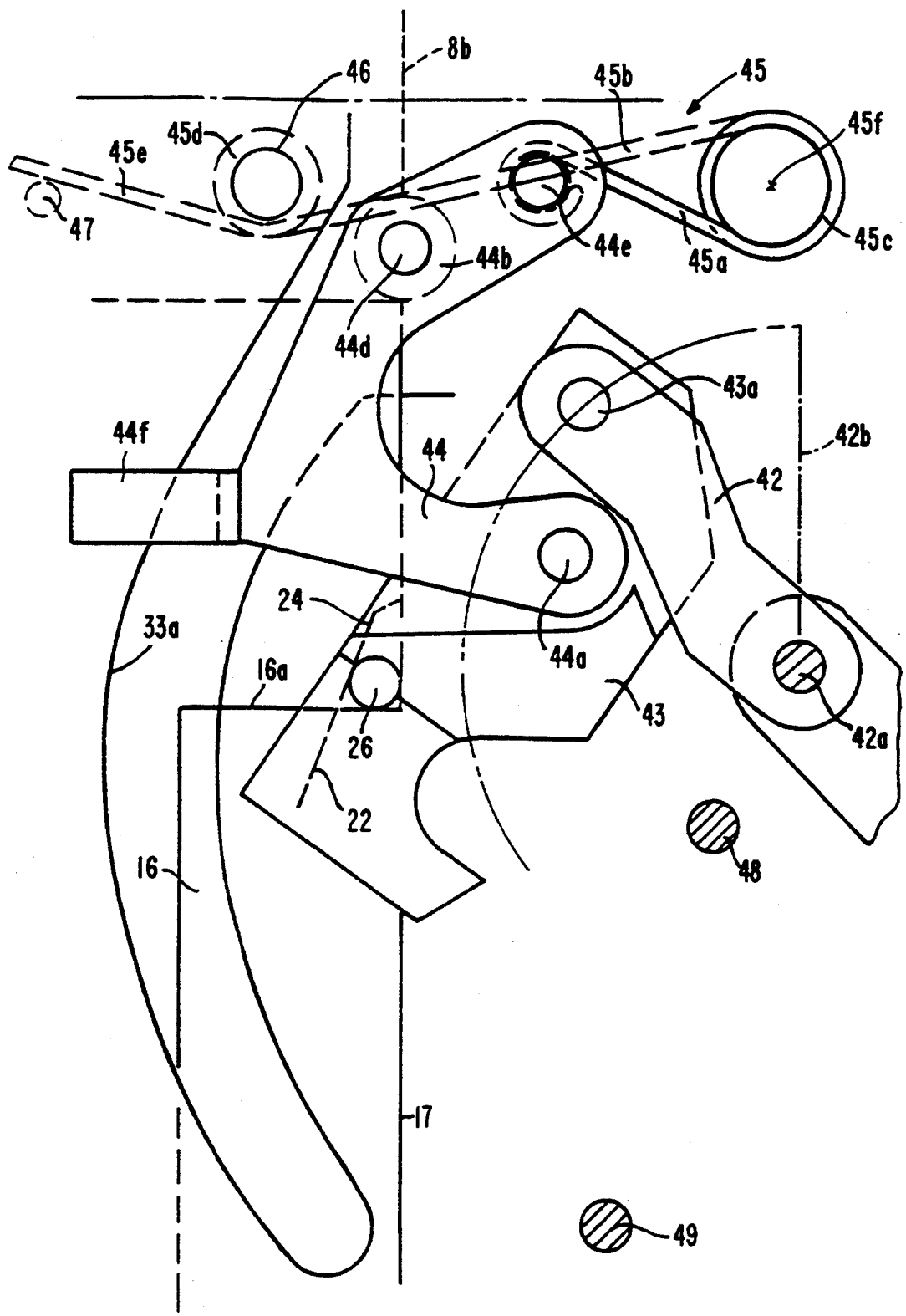

As is evident in particular from FIG. 7, the sensing lever tensions the spring 45 via the activated sensing roller 44b when the cassette 13 is inserted. The center 45f of the spring loop 45c is always situated in an area which can be defined by an extension 8b of the partly open side wall 17 in the direction of insertion and a line 42b parallel thereto and intersecting the spindle 42a, the spring arms 45a, 45b extending towards the extension of the partly open side wall 17, i.e. the extension 8b (FIGS. 3 and 7).

The opening lever 43 carries the opener pin 26 which cooperates with the guide profile 22 of the digital cassette. In addition to the stop 47 there are provided two further stops 48 and 49. The stop 48 retains the supporting lever 42 during its anticlockwise movements. The stop 49 defines the starting position of the opening lever 43. The stop 49 also has another function, which is described hereinafter.

Figure 4:
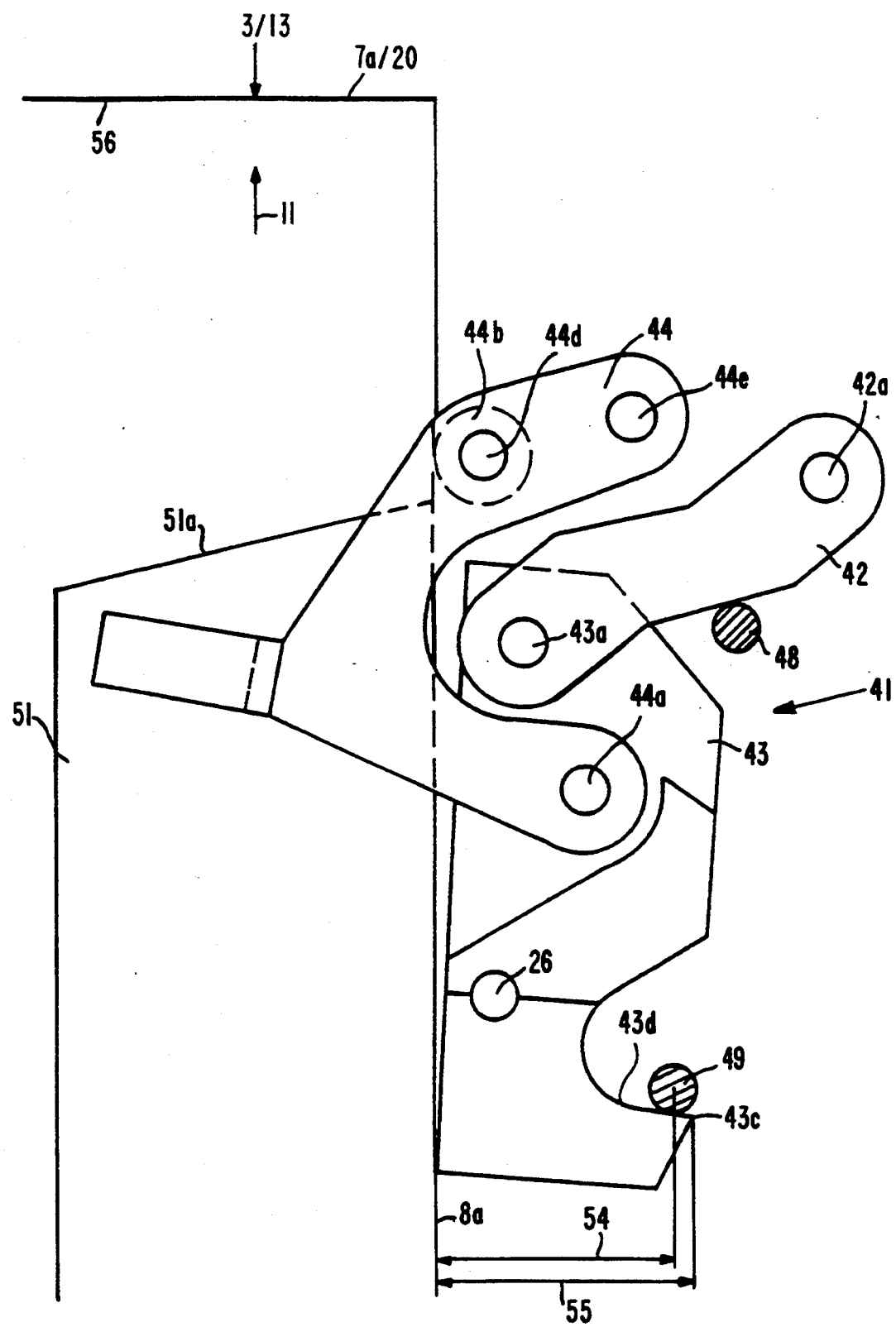
FIG. 4 shows the detection mechanism after insertion of an analog magnetic-tape cassette.

FIG. 3 shows the detection mechanism 41 during starting of the deck 31 upon insertion of a magnetic-tape cassette. As can be seen in FIG. 4, this magnetic-tape cassette can be either an analog Compact Cassette 3 or a digital cassette 13. The two cassettes can be distinguished from one another in that the analog cassette has a thicker portion 51 with an edge 51a on the cassette main wall 7a. The digital cassette does not have a thicker portion 51 and an edge 51a. However, both cassette types have a continuous edge 8a. This continuous edge 8a is used as a contact edge along which the opening lever 43 can move. The digital cassette has the guide profile 22 in which the opener pin 26 is engageable.

When a cassette 3 or 13 is inserted into the cassette holder 33 it comes into contact with the sensing roller 44b. The insertion movement in the direction indicated by the arrow 11 causes the spring 45 to be tensioned. This results in the following force and movement constellation. The opener spring 45 subjects the sensing lever 44 to a force in the direction $-x$ via the sensing roller 44b. At the same time the opener spring 45 subjects the sensing lever 44 to a force in the direction $+x$ via the pin 44e, urging the lever clockwise about the spindle 44d. As a result of the force exerted on the sensing lever 44 via the spindle 43a the supporting lever 42 is urged clockwise and abuts against the stop 48. If the sensing roller 44d were fixed the mechanism would get jammed. However, the sensing roller 44d can move in the direction $+y$ towards a corner 53 of the magnetic-tape cassette 3 or 13. When the cassette 3 or 13 is further inserted the sensing roller 44b now moves towards the corner 53. The sensing lever 44 is then pivoted clockwise about the instantaneous position of the spindle 44d. The spindle 44a thus moves clockwise. At the same time the opening lever 43 is also pivoted clockwise about the spindle 43a.

If the magnetic-tape cassette just inserted is an analog Compact Cassette 3 the opening lever 43 is positioned adjacent the edge 8a of the analog cassette with an edge 43b. The edge 43b engages against the edge 8a. The stop 49 is situated at a distance 54 from the edge 8a and the edge 43b is situated at a distance 55 from the end 43c of a profile 43d of the opening lever 43. This means that when the edge 43b engages against the edge 8a the end 43c cannot move past the stop 49 as a result of the longer distance 55 between the edge 43b and the end 43c. As the analog cassette is inserted further the opening lever 43 cannot move along in the direction of insertion because it is coupled to the stop 49. As a result of this, the sensing lever 44 is now pivoted further clockwise about the spindle 44a and the sensing roller 44b moves past the corner 53. As the opening lever 43 can move along the edge 8a with its edge 43b the sensing roller 44b now also moves along the edge 8a until the cassette has reached its end position represented by a line 56.

FIG. 4 shows this end position for the analog cassette. The Figure shows how the edge 43b of the opening lever 43 engages against the edge 8a of the analog magnetic-tape cassette 3 and that the end 43c of the profile 43d cannot move past the stop 49.

The cycle of movements described for an analog magnetic-tape cassette 3 is also performed when a digital magnetic-tape cassette is inserted with the wrong side. In the case of the digital magnetic-tape cassette the guide profile 22 is situated at one side only, i.e. at the location of the main wall 18. Since the other main wall 19 does not have a guide profile 22 the detection mechanism in fact detects an analog magnetic-tape cassette and during the subsequent loading cycle it will treat the misinserted digital magnetic-tape cassette as an analog magnetic-tape cassette. Ultimately, this means that the misinserted digital magnetic-tape cassette 13 cannot be played in this direction of insertion because certain detections are not possible.

Figure 5:
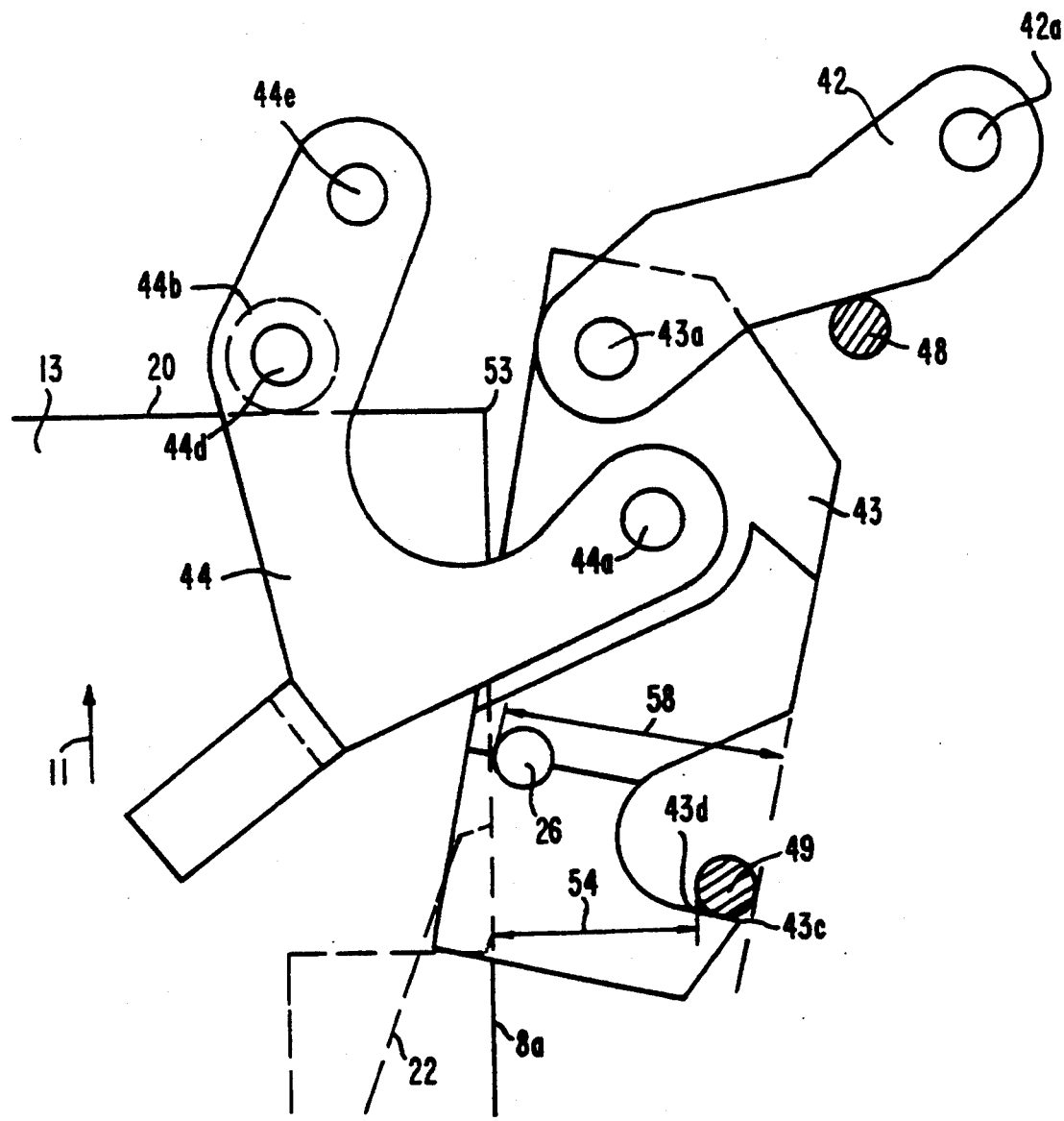
FIGS. 5 to 8 show the detection mechanism upon insertion of a digital magnetic-tape cassette in different insertion positions from the beginning till the end of the insertion process.

If a digital magnetic-tape cassette 13 is inserted during the starting process as illustrated in FIG. 3 the cycles of movement of the detection mechanism are initially identical to those during insertion of an analog magnetic-tape cassette. The supporting lever 42 abuts against the stop 48. The opening lever 43 abuts against the stop 49. As a result of the force exerted on the pin 44e in the direction +X the sensing lever 44 is subjected to a clockwise torque and is pivoted. The sensing roller 44 moves to the side wall 20 of the digital magnetic-tape cassette 13 towards the corner 53. The sensing lever 44 is pivoted clockwise and also pivots the opening lever 43 clockwise via the spindle 44a. The digital magnetic-tape cassette 13 has the guide profile 22. The digital magnetic-tape cassette 13 also has a partly open side wall 17. The opening lever 43 engages against this partly open side wall 17 under the influence of the sensing lever 44. The opening lever can move past the digital magnetic-tape cassette because this cassette does not have the thicker portion 51. This enables the opener pin 26 to engage against the partly open side wall 7 of the cassette 13. When the magnetic-tape cassette is further inserted the opener pin 26 moves along the wall 17, in whose subsequent part the guide profile 22 is present. During the movement along the partly open side wall 17 the profile 43d of the opening lever 43 remains initially in engagement with the stop 49 because a distance 58 between the front of the opener pin 26 and the end 43c of the profile 43d is larger than the distance 54 (FIG. 5).

Figure 6:
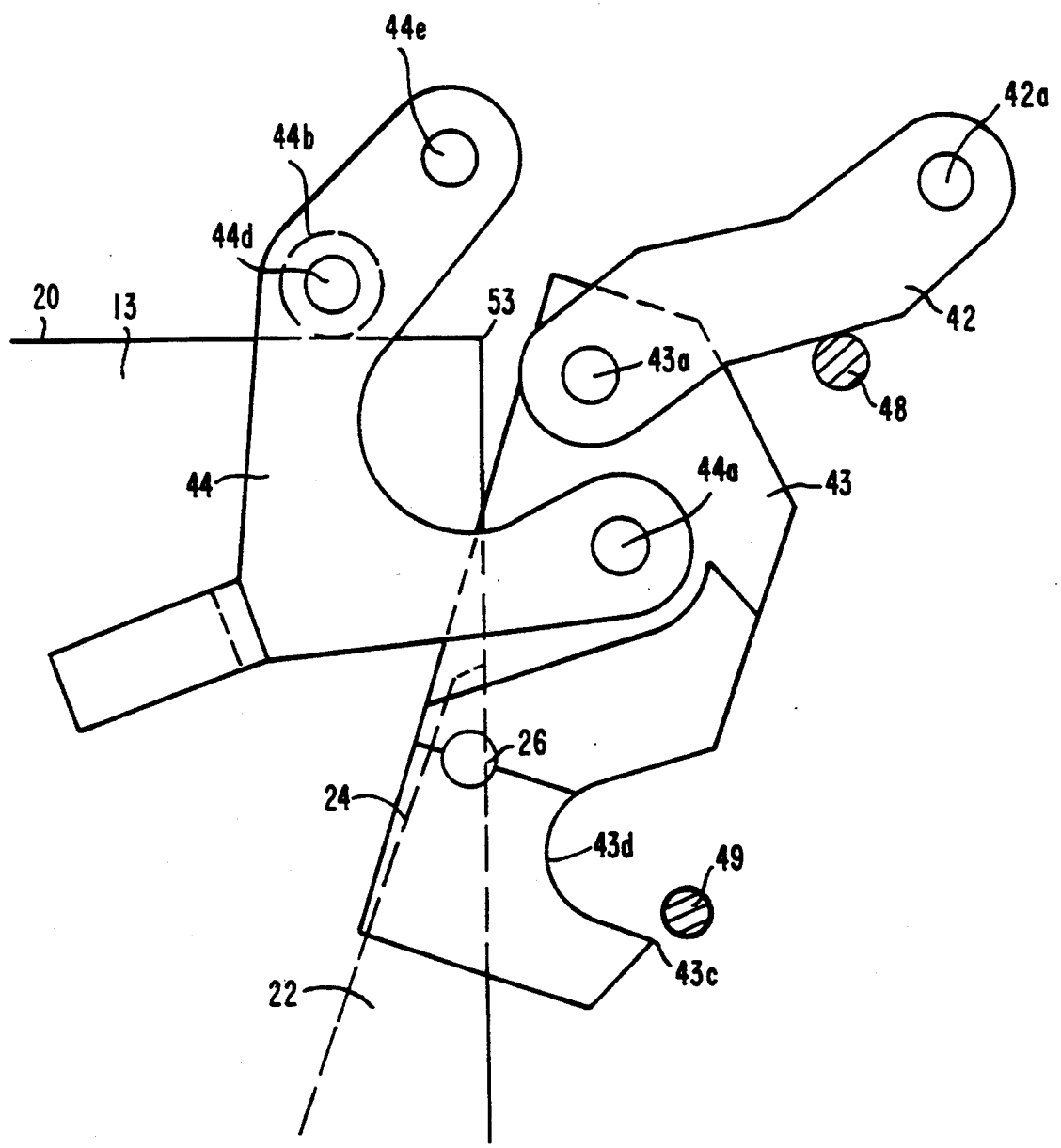

FIG. 6 shows a configuration in which the opener pin 26 recognizes the guide profile 22 and engages the end portion 23 of this profile with the guide edge 24. During this engagement the opening lever 43 has moved so far clockwise that the end 43c of the profile 43d is clear of the stop 49. When the opener pin 26 is situated in the entry portion 23 the opener pin 26 engages against an edge 16a of the sliding cover 16 but not yet moves this cover. This is achieved as follows. The loop 45d of the spring 45 exerts a force component in the direction −y on the pin 44e (FIG. 3). The cassette 13 is now inserted deeper. The two arms 45a and 45b of the spring 45 are bent towards one another.

Initially, the supporting lever 42 is still in engagement with the stop 48. Since the opening lever 43 has been released because the end 43c of the profile 43d can move past the stop 49, the cassette 13, presses the detection mechanism 41 in a clockwise direction about the spindle 42a. The supporting lever 42 is then disengaged from the stop 48 because it is also pivoted clockwise. As a result of this clockwise movement of the supporting lever 42 towards the opening lever 43 the force exerted on the guide profile 22 by the opener pin 26 is minimised. When the detection mechanism 41 is pivoted and the opener spring 45 is further tensioned the loop 45c is moved anticlockwise about the pin 46 and gradually a component +Y is produced on the pin 44e via the arm 45a. During the pivotal movement a guide projection 44f is guided on a profile 33a of the holder 33.

This means that upon insertion of the cassette 13 the sensing lever 44 tensions the opener spring 45, which in its turn exerts a force opposed to the insertion force and a force directed away from the cassette corner 53 on the cassette 13 via the pin 44e, so that initially the sensing roller 44b cannot move around the corner 53 of the cassette. When the cassette 13 is inserted deeper and consequently the force directed away from the cassette corner 53 is no longer exerted on the sensing roller 44b by the spring 45 the sensing roller 44b moves towards the cassette corner 53 and moves around this corner as soon as the action of the force changes from an orientation away from the cassette corner 53 to an orientation towards the cassette corner 53, as a result of which the opener pin 26 begins to move the sliding cover 16 in a direction opposite to the direction of insertion and thus expose the access openings 9, 10 (FIG. 7).

Figure 8:
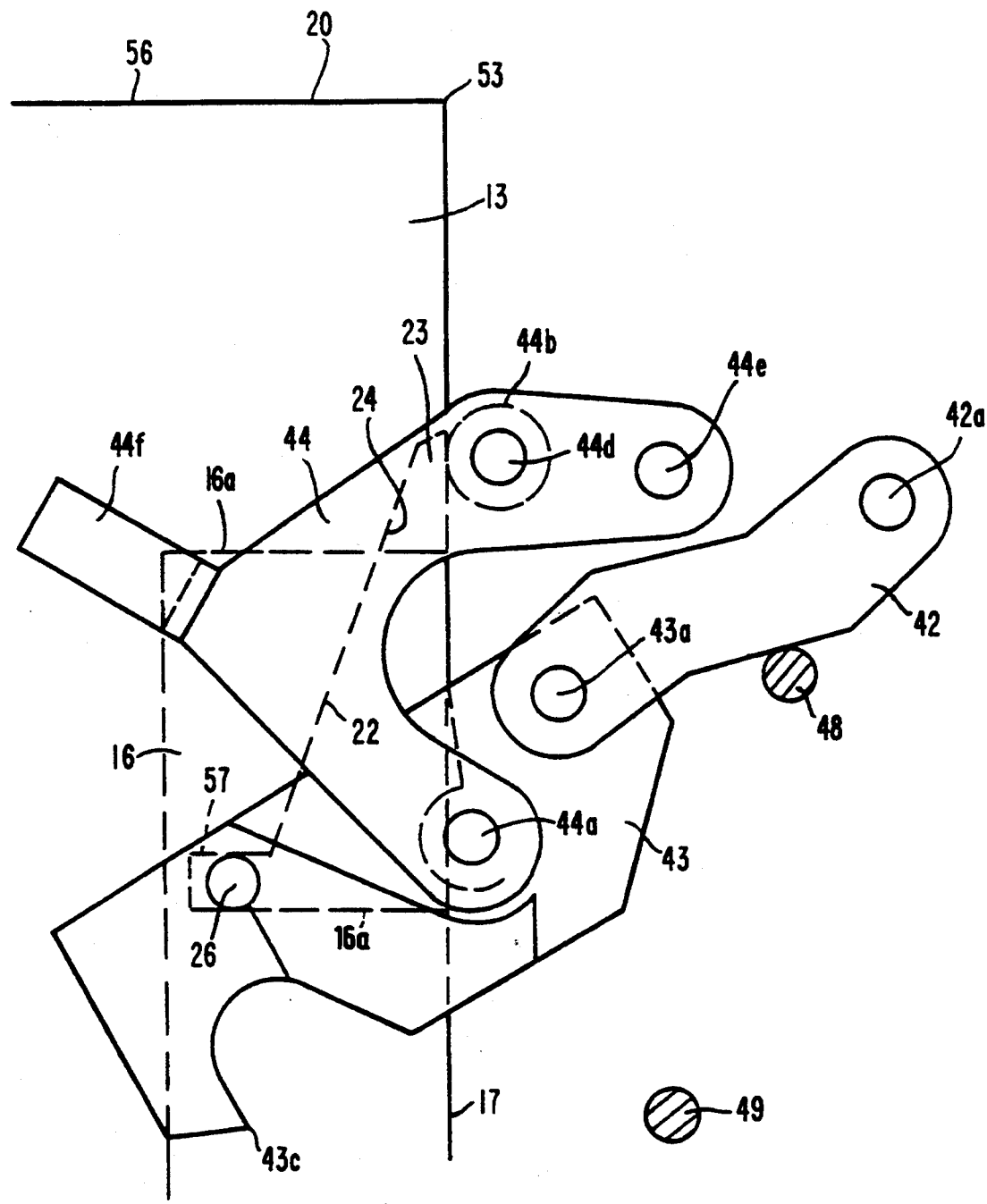

As is shown in FIG. 7 the sensing roller 44b then rolls in a direction towards the corner 53. The force in the +Y direction on the pin 44e increases further as a result of the action of the arm 45a (FIG. 3). As soon as this force in the +Y direction exceeds the force of the loop 45d in the −Y direction the sensing roller 44b moves around the corner 53. The opener spring 45 is now relaxed in that it moves the sensing roller 44 along the partly open side wall 17, the opener pin 26 moving the sliding cover 16 over the edge 16a in a direction opposite to the direction of insertion. At the same time in an oppositely directed movement the cassette 13 is further inserted in the direction indicated by the arrow 11 until it reaches the end position 56, in which the sliding cover 16 has exposed the access openings 9 and 10 (FIGS. 1c, 8).

The instant at which the sliding cover is opened during insertion of the cassette is dictated by the force ratio +Y/−Y. The change in force ratio occurs at the instant at which the sensing roller 44b moves around the corner 53. The change in force ratio can be influenced by the spring constant, the spring shape and the position of the spring relative to the sensing roller 44b.

Figure 9A:
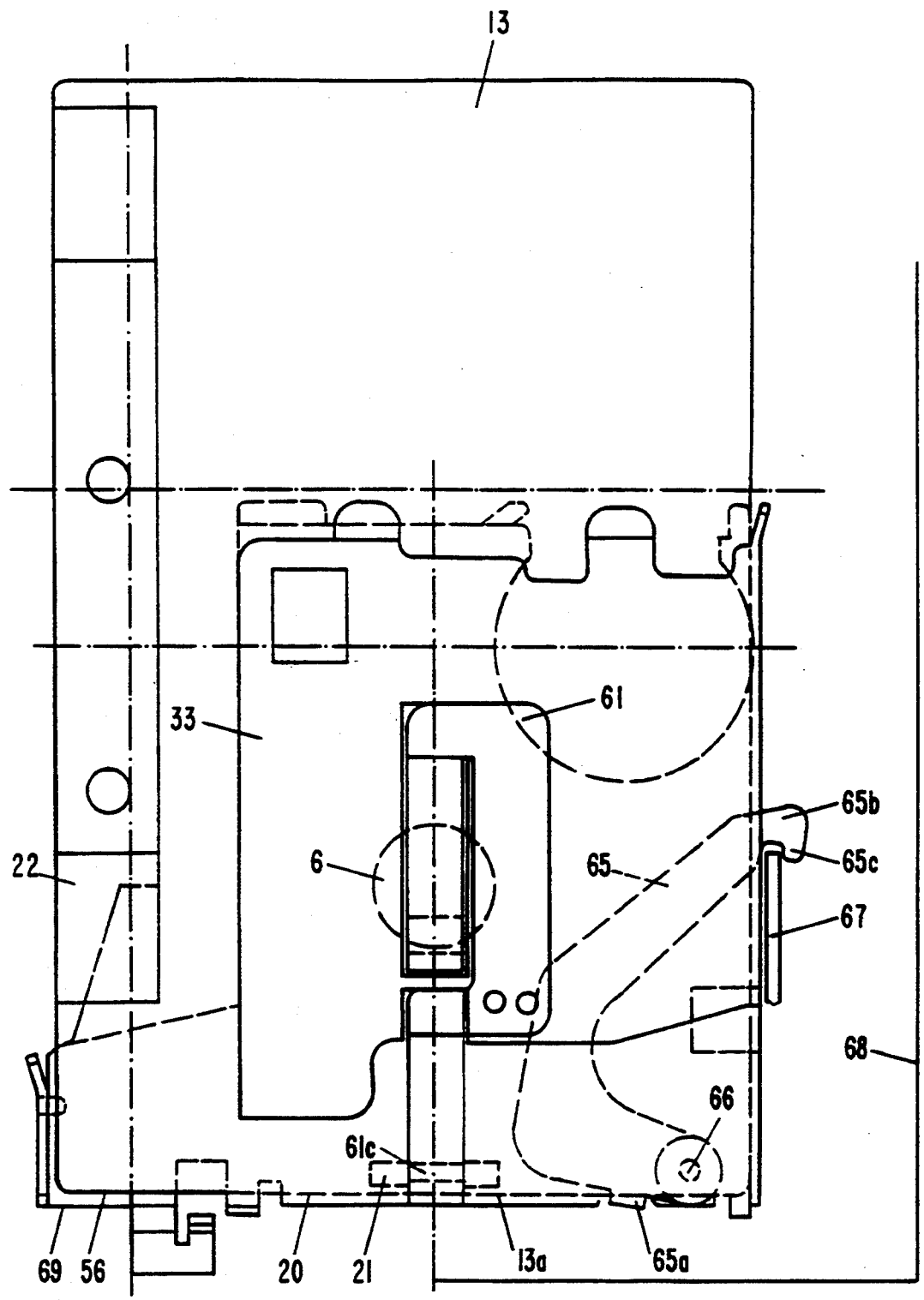
FIG. 9a is a plan view of the loading mechanism for magnetic-tape cassettes as shown in FIGS. 1A to 1C with a cassette holder briefly before the magnetic-tape cassette reaches its end position in the cassette holder.
Figure 9B:
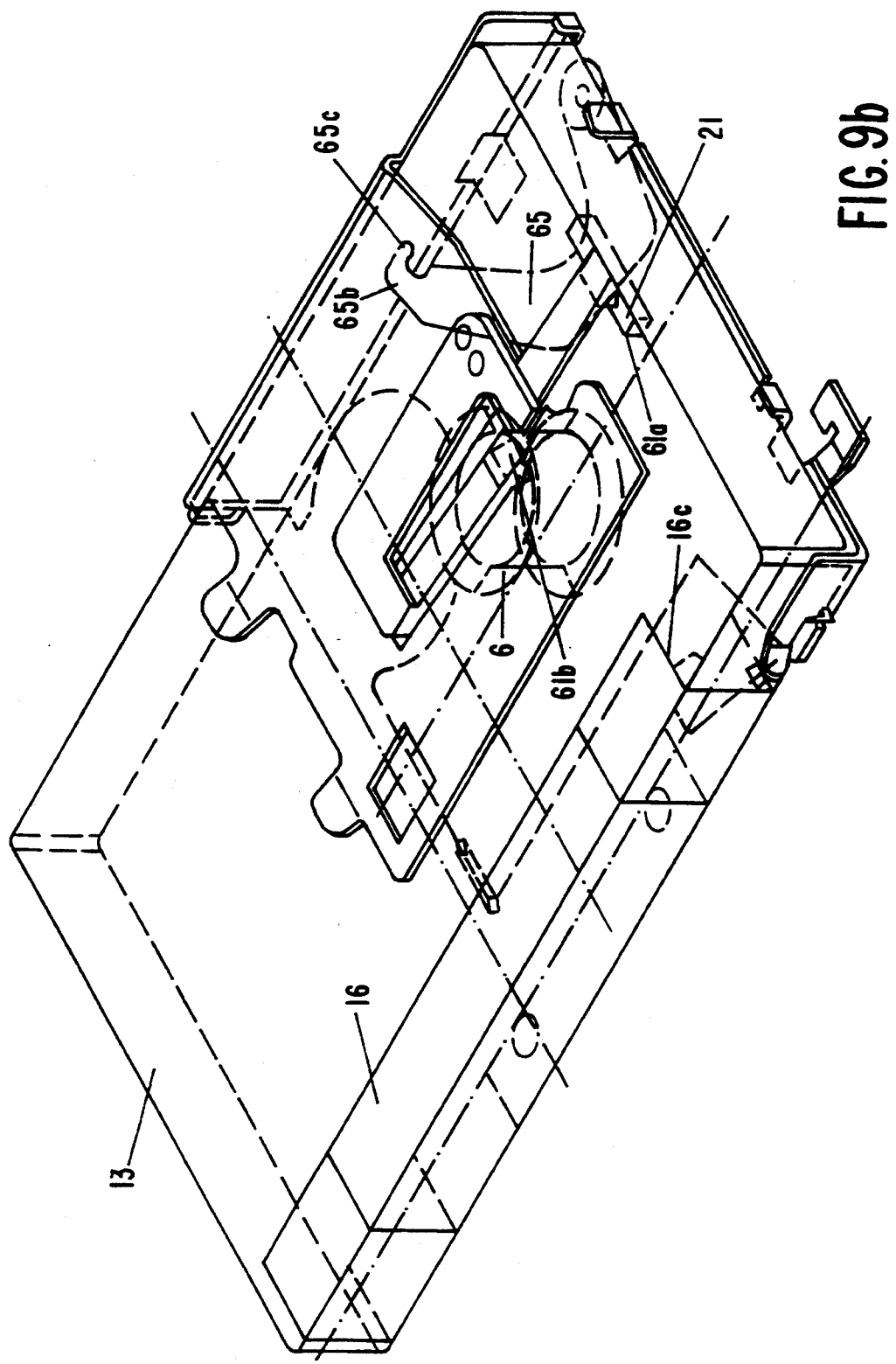
FIG. 9b is an isometric view of the mechanism shown in FIG. 9a, FIG. 9c is a side view of the loading mechanism shown in FIG. 9a, FIG. 10a is a plan view of the loading mechanism shown in FIGS. 9a to 9c, the magnetic-tape cassette having reached its end position.

While the magnetic-tape cassette is loaded into the cassette holder the detection mechanism exerts a counter force on the cassette, which force is applied by the loop spring 45. This counter force is active until the magnetic-tape cassette has assumed its end position 56 in the cassette holder 33. In the case of the digital cassette the opener pin 26 is then situated behind a stop edge 57. Moreover, the sliding cover 16 lies against the opener pin 26 with its edge 16a. Care should now be taken that the opener pin cannot move out of this position as a result of tolerances. This is in order to ensure that the access openings 9 and 10 remain fully open. The opener pin 26 is latched behind the stop edge 57 with the aid of a cassette-retaining member 61 (FIG. 9a). This cassette-retaining member 61 comprises limbs 61a and 61b. The limb 61a cooperates with the coupling groove 21 of the digital magnetic-tape cassette 13. The limb 61b cooperates with the reel-spindle hole 6 of the analog magnetic-tape cassette 3.

Figure 9C:
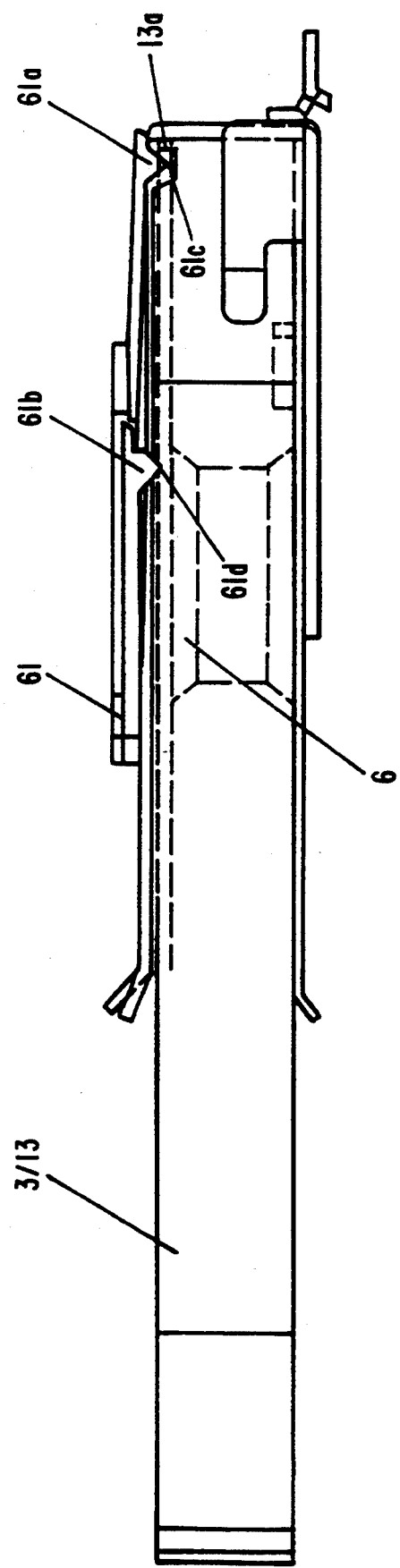

When the digital magnetic-tape cassette 13 has nearly reached its end position the tip 61c of the limb 61a engages behind an edge 13a of the coupling groove 21 of the digital magnetic-tape cassette 13 (FIG. 9c). When the magnetic-tape cassette 13 is further inserted into the cassette holder 33 the forward side wall 20 of the digital magnetic-tape cassette 13 abuts against a projection 65a of a latching lever 65. This latching lever 65 is pivotably mounted on a pin 66 underneath the holder 33, which pin is secured in the holder. The latching lever 65 has a latching hook 65c at its free end 65b. This hook 65c initially engages with a stop 67 of the chassis 68.

When the forward side wall 20 of the digital magnetic-tape cassette 13 abuts against the projection 65a of the latching lever 65 the stop 67 and the latching hook 65c become disengaged from one another. The latching lever 65 is loaded by a spring (not shown) in the clockwise direction. Upon disengagement of the hook the inserted magnetic-tape cassette 13 pivots the latching lever anticlockwise and unlocks the holder 33 from the chassis. The cassette 13 in fact tends to be moved back by the latching lever which is spring-loaded in the clockwise direction. However, this is prevented in that the limb 61a of the cassette-retaining member 61 has engaged the coupling groove 21.

Figure 10A:
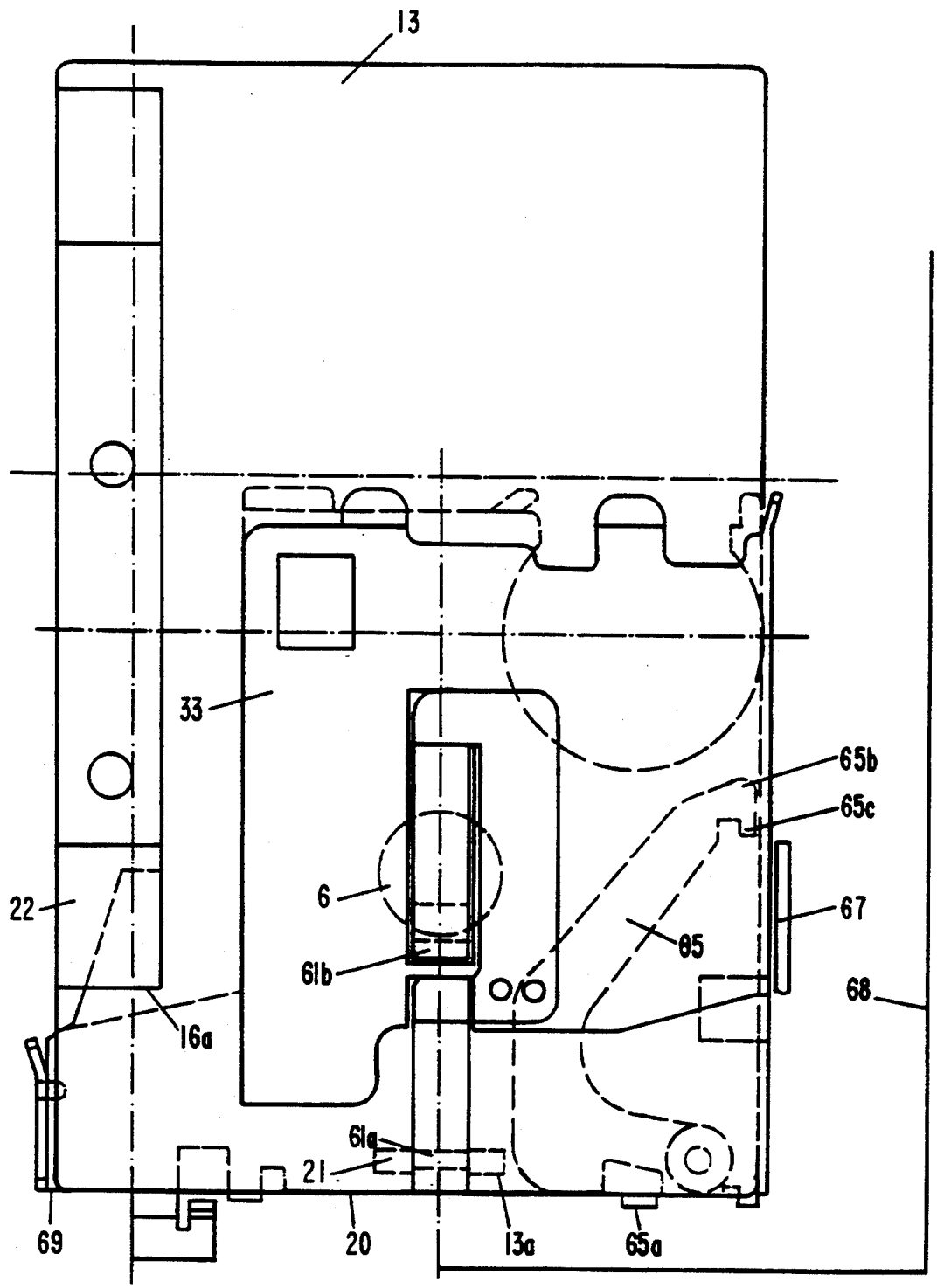
Figure 10B:
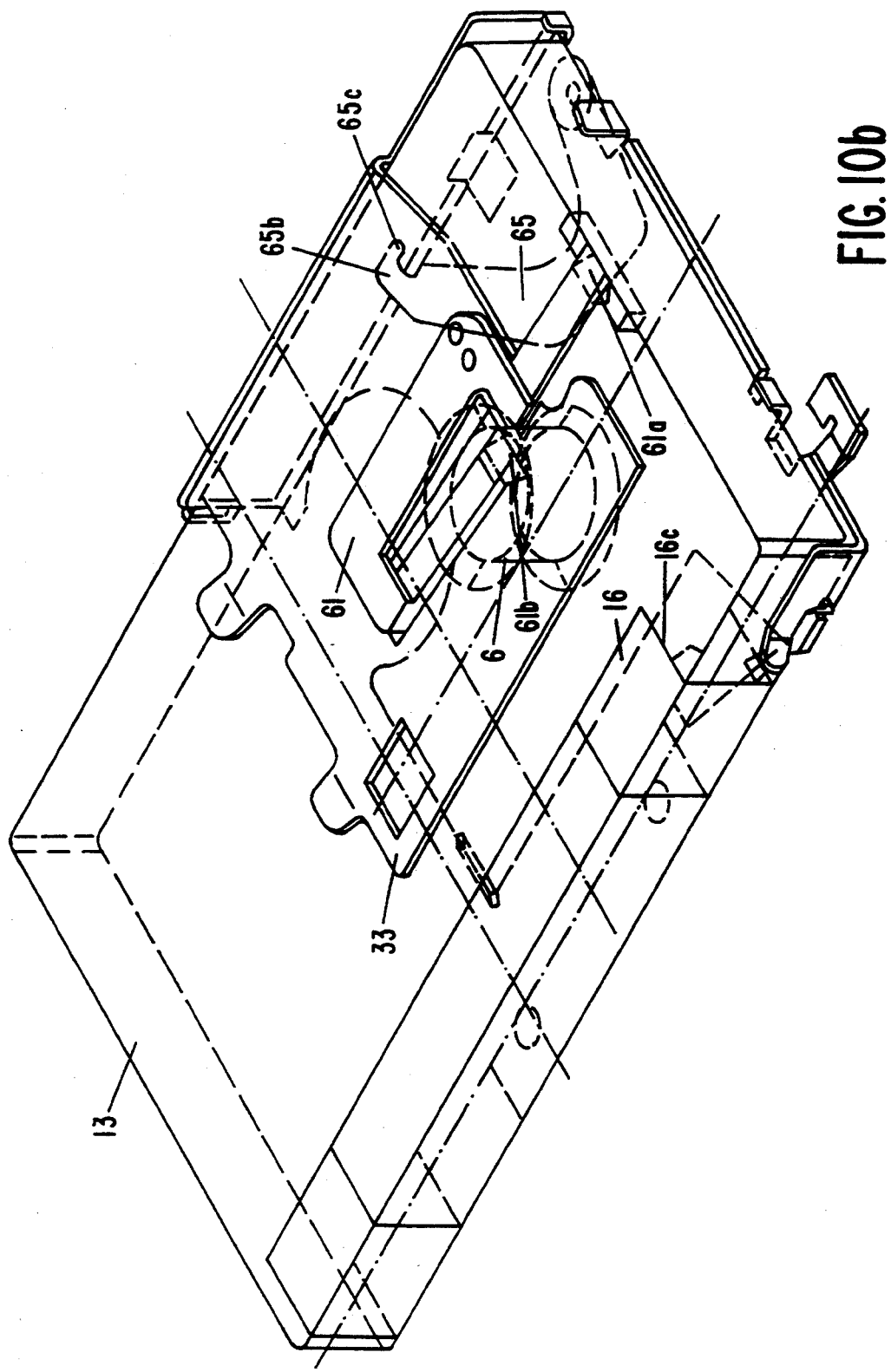

FIG. 10a shows the positions of the parts relative to one another when the cassette 13 has been inserted fully into the cassette holder 33. The latching lever 65 has been pivoted anticlockwise, the cassette 13 lies with its forward side wall 20 in the end position 56 in the holder 33, and the limb 61a of the cassette-retaining member 61 has fully engaged the coupling groove 21. The magnetic-tape cassette 13 is now immobilised in the predetermined position in the holder 33 and can be moved together with the holder 33. The opener pin 26 cannot be disengaged from the stop edge 57.

Figure 10C:
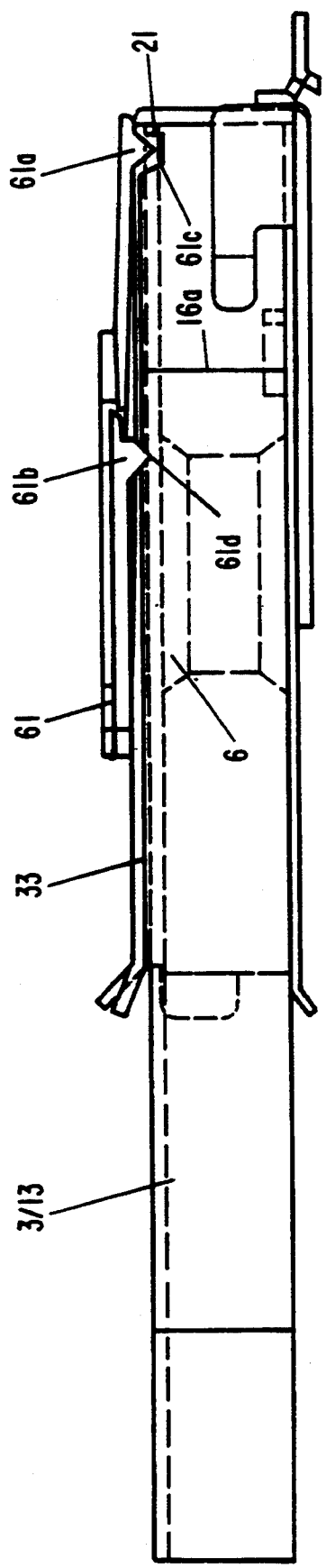

When an analog magnetic-tape cassette 3 is inserted into the holder 33 the limb 61b of the cassette-retaining member 61 initially engages the reel-spindle hole 6 with its tip 61d in a way corresponding to that in the case of the digital magnetic-tape cassette 13 (FIG. 10c). This is the instant at which the forward side wall 12 of the analog magnetic-tape cassette 3 abuts against the projection 65a (FIG. 10a). The latching hook 65c is now pivoted out of engagement with the stop 67 and the latching lever 65 is pivoted anticlockwise under the influence of the insertion force of the analog magnetic-tape cassette 3. When the magnetic-tape cassette 3 has reached its end position in the holder 33 the limb 61b has fully engaged the reel-spindle hole 6. The analog magnetic-tape cassette 3 now occupies an unambiguously defined position relative to the holder 33 and can subsequently be moved together with the holder.

These cycles of relative movements ensure that the holder together with the magnetic-tape cassette can be moved further only when the sliding cover 16 is in its fully open position. It is important for this that the limb 61a already has engaged the coupling groove at least partly when disengagement of the latching lever begins. When disengagement begins there should already be a fixed mutual contact between the magnetic-tape cassette and the limb 61a.

Figure 11:
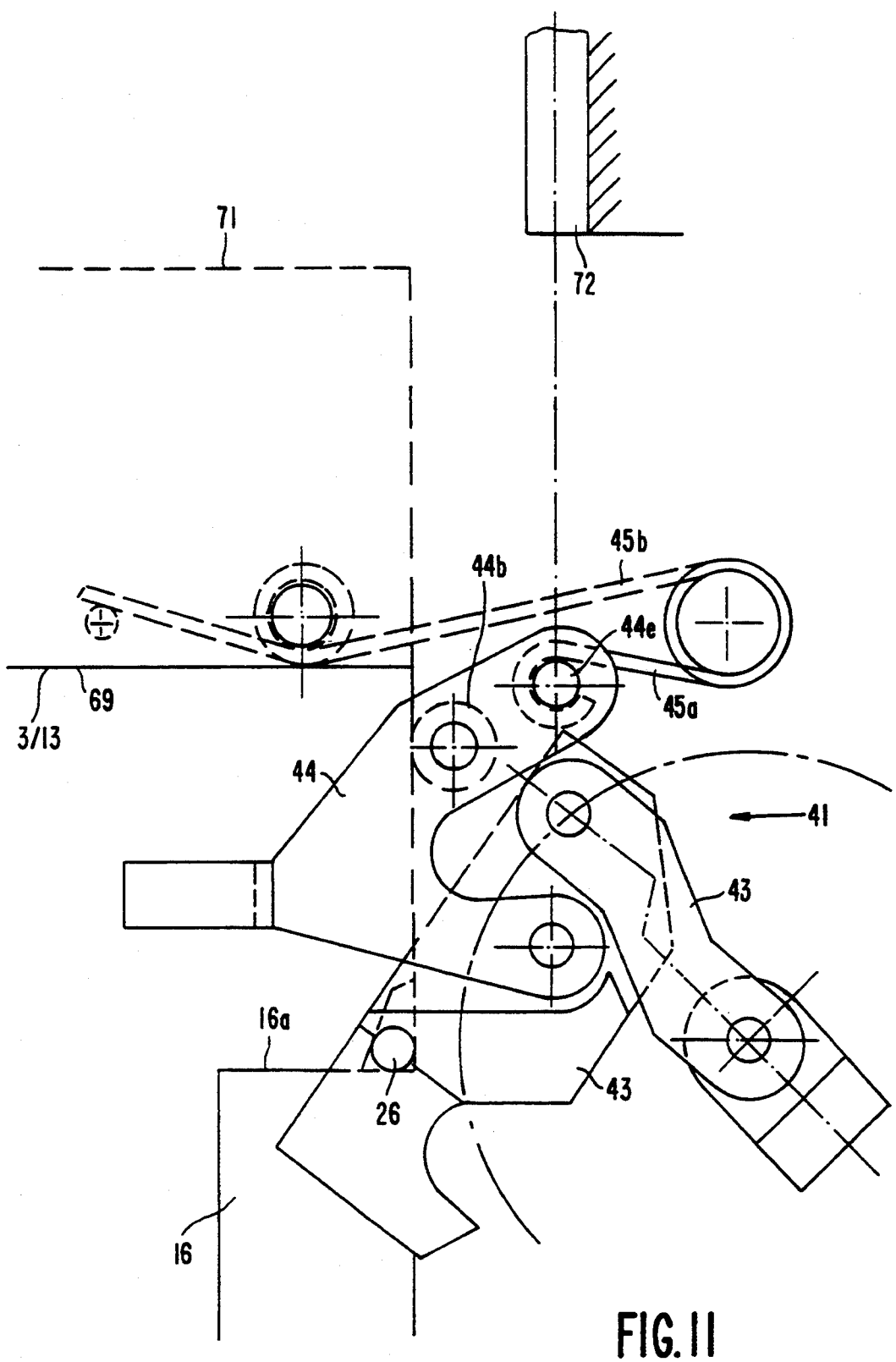

FIG. 11 shows a modification of the loading mechanism 32. In the loading process described so far the magnetic-tape cassette is inserted by hand and the sliding cover 16 of a digital cassette 13 is opened already during this insertion by hand. However, there are also servo decks in which a part, i.e. the last part, of the insertion movement is effected by means of a motor. The loading mechanism 32 can also be adapted to such a motor-assisted insertion. It is desirable that in the case of motor-assisted insertion the sliding cover of the digital cassette is opened during the last part of the insertion movement when the motor has taken over insertion. The loading mechanism comprises a switch which starts the loading motor at the end of the hand-insertion path, which motor subsequently moves the cassette holder further in the direction of insertion. This motor-assisted insertion should be attended by motor-assisted opening of the sliding cover 16. This means that the detection mechanism 41 should actuate the sliding cover 16 in a concurrent opposite movement during the motor-assisted loading process. Opening of the sliding cover then proceeds in the same way as described with reference to FIG. 7 but with the difference that the opener spring 45 no longer moves the sliding cover 16 aside when the sensing roller 44b has moved around the corner 53. This means that the sliding cover is still closed when the cassette has reached the stop position 69. This stop position 69 is also the eject position during the subsequent ejection of the cassette. The position is the same as in the preceding embodiment (with insertion by hand) but the sliding cover 16 has not yet been opened.

For this purpose the detection mechanism 41 has been modified in that the opener spring 45 is now weaker. It is capable of returning the detection mechanism into the starting position shown in FIG. 3 but it is not capable by itself of moving the sliding cover 16 via the opening lever 43 and the opener pin 26.

When the analog cassette 3 or the digital cassette 13 reaches the stop position 69 the loading motor, not shown, is started in a manner which will not be described. The cassette holder 33 now moves further in the direction of insertion 11 into a position above the play position, into which the cassette is lowered from this end position 71. Them is provided a stop 72 against which the pin 44e of the sensing lever 44 strikes during its movement between the positions 69 and 71 of the cassette. As the movement of the cassette 3, 13 proceeds this striking results in the sensing lever and the entire detection mechanism 41 being halted, so that the opener pin 26 moves the sliding cover 16 into its open position while the cassette 13 moves on.

When an analog cassette 3 is inserted the stop 72 does not meet the pin 44e. Since the opening lever 43 remains coupled to the stop 49 (FIG. 4) the analog cassette 3 moves past the detection mechanism 41 and the pin 44e does not even come in the vicinity of the stop 72.

In this case the cassette-retaining member 61 should exert a larger force to retain the cassette 13, in order to counteract the closing force of the closing-cover spring when the sliding cover 16 is opened. Therefore, it should be constructed so as to counteract the closing force. However, the cassette-retaining member 61 should produce this increased force only during the time that the sliding cover is moved. After this movement the opener pin 26 is latched again between the stop edge 57 and the edge 16a of the sliding cover.

We claim:

1. An arrangement of a magnetic-tape-cassette apparatus, including a deck and a loading mechanism having a holder for magnetic-tape cassettes, into which holder the cassettes can be inserted, and the magnetic-tape cassette having recesses in plane-parallel main walls and having in one of two long side walls interconnecting the main walls and access openings for the entry of a sound head and pressure rollers, two short side walls also interconnecting the main walls, a detection mechanism being provided in order to detect first second magnetic-tape cassette types with different tape-recording standards and housing configurations, the second cassette type having a guide profile and a slidable cover disposed along the long side wall having the access openings, said guide profile permitting engagement with the slidable cover, the detection mechanism includes a sensing element to sense the cassette side wall in the first cassette type and engage the guide profile and the sliding cover of the second cassette type and move said cover so far that the access openings are exposed, characterized in that upon insertion of said magnetic-tape cassette in a longitudinal direction in which its tape spools are aligned, the detection mechanism is activated by the short side wall which faces forward during insertion and moves the sensing element without the sliding cover at this time being urged towards the position in which it exposes the access openings, and as insertion proceeds the sensing element moves to the long cassette side wall having the access openings and moves along this wall, the sensing element detecting the cassette type just inserted and depending on the type of cassette inserted moves freely past said wall up to the end of the insertion path for cassettes of the first type and engages the guide profile in the second cassette type to open the sliding cover towards the end of the insertion path.

2. An arrangement as claimed in claim 1, characterized in that the detection mechanism comprises a multiple-lever system which under spring load cooperates with cassette side walls at both sides of a cassette corner which in the direction of insertion bounds the forward end of the partly open side wall of the cassette, upon insertion of said cassette the sensing element on a sensing lever of a multiple-lever system is moved against a spring load by the cassette side wall facing forward in the direction of insertion of its tape cassette, at the same time an opening lever of the multiple-lever system senses the partly open side wall to detect the guide profile of the magnetic-tape cassette comprising the sliding cover.

3. An arrangement as claimed in claim 2, characterized in that the opening lever has a profile which cooperates with a stop of the cassette holder in such a manner that upon detection of the guide profile by the sensing element the opening lever can be moved in the direction of insertion past the stop and in the absence of the guide profile said opening lever remains in engagement with the stop.

4. An arrangement as claimed in claim 3, characterized in that when the opening lever is moved along in the direction of insertion the point where opening of the sliding cover begins is transferred to such a mutual position of the cassette and a loading aperture in the front panel of the apparatus that when opening begins the sliding cover of the cassette of the second type is already situated behind the front edge of the front panel.

5. An arrangement as claimed in any one of the claim 3, characterized in that when it is arrested by the stop upon insertion of the cassette the opening lever is forced to move along the partly open side wall, the sensing element being forced to move around the cassette corner even in the case of the small spring load.

6. An arrangement as claimed in any one of the claim 5, characterized in that the sensing lever pivotally cooperates with the opening lever by means of a pivot, which opening lever cooperates with a supporting lever by means of a pivot, which supporting lever is pivotally mounted on the cassette holder, the sensing lever being connected to the cassette holder by means of an opener spring in such a manner that the opener spring which is tensioned upon insertion of the magnetic-tape cassette exerts a clockwise torque on the sensing lever axed thus on the opening lever, which torque urges the sensing lever towards the cassette corner and the free lever end of the opening lever towards the partly open side wall of the cassette.

7. An arrangement as claimed in claim 6, characterized in that the opening lever carries an opener pin which engages the guide profile if present, thereby enabling the profile of the opening lever to be disengaged from the stop.

8. An arrangement as claimed in claim 7, characterized in that with the opening lever disengaged, actuated by the cassette by the sensing element and the sensing lever as well as the pivots and the supporting lever pivots clockwise about its spindle, the opener pin being moved accordingly with the cassette in the direction of insertion, so that it cannot move the sliding cover relative to the cassette.

9. An arrangement as claimed in claim 8, characterized in that a connecting line extends through the axis of the spindle of the sensing lever and the axis of the spindle between the sensing lever and the opening lever, and the point of application of the opener spring is situated on a normal to said connecting line at the location of the axis of the spindle, which spring is supported in the cassette holder.

10. An arrangement as claimed in claim 9, characterized in that upon insertion of the cassette the sensing lever tensions the opener spring which by the pin exerts a force directed oppositely to the insertion force on the cassette and also exerts a force acting in a direction away from the cassette corner, thereby initially preventing the sensing element from moving around the cassette corner.

11. An arrangement as claimed in claim 10, characterized in that when the cassette is inserted deeper and consequently the force directed away from the cassette corner ceases the sensing element moves towards the cassette corner and moves around said corner as soon as the action of the force changes from an orientation away from the cassette corner to an orientation towards the cassette corner, upon which the opener pin begins to move the sliding cover in a direction opposite to the direction of insertion and thus to expose the access openings.

12. An arrangement as claimed in the claim 11, characterized in that the opener spring is a loop spring having a first spring arm acting upon the pin of the sensing lever and having a second spring arm which at its end which is remote from the spring loop has a further loop, from which a third spring arm projects whose free end lies against the stop.

13. An arrangement as claimed in claim 12, characterized in that the centre of the spring loop is always situated in an area which can be defined by an extension of the partly open side wall in the direction of insertion and a line parallel thereto and intersecting the spindle, spring arms, extending towards the extension of the partly open side wall.

14. An arrangement as claimed in claim 13, characterized in that after the sensing element has moved around the corner upon detection of a magnetic-tape cassette of the second type the opener pin, as the cassette is inserted deeper, moves along the guide profile until it engages behind a stop edge, the opener pin moving the sliding cover from the closed position into the open position.

15. An arrangement as claimed in claim 14, characterized in that the opener pin is latched behind the stop edge with the aid of a cassette-retaining member which is arranged on the cassette holder and which engages a coupling groove in the digital magnetic-tape cassette.

16. An arrangement as claimed in claim 15, characterized in that the cassette-retaining member engages the coupling groove with a limb.

17. An arrangement as claimed in claim 16, characterized in that upon insertion of a magnetic-tape cassette into the cassette holder up to an end position said holder together with the cassette can be moved further into a stop position, the cassette holder is latched against movement until the instant at which the cassette in it has reached its end position, latching of the cassette holder is not discontinued until the cassette-retaining member has already engaged the cassette.

18. An arrangement as claimed in claim 8, characterized in that when latching of the cassette holder ceases the cassette-retaining member has loosely engaged the cassette with a limb portion, and when the cassette has reached its stop position in the cassette holder the limb for the cassette of the second type is in full positive engagement with a coupling groove or the limb for the cassette of the type is in full positive engagement with a reel-spindle hole.

19. An arrangement as claimed in claim 8, characterized in that latching of the cassette holder is effected by means of a latching lever which is engageable behind a stop of the chassis with a latching hook, which is disengageable therefrom by the cassette, and which has a free end which is spring-loaded in the clockwise direction.

* * * * *